(12) United States Patent
Vigneras

(10) Patent No.: US 9,502,184 B2
(45) Date of Patent: Nov. 22, 2016

(54) METHOD FOR MANUFACTURING A UNIT FOR STORING ELECTRICAL ENERGY

(71) Applicant: BLUE SOLUTIONS, Ergue Gaberic (FR)

(72) Inventor: Erwan Vigneras, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 211 days.

(21) Appl. No.: 14/377,166

(22) PCT Filed: Feb. 7, 2013

(86) PCT No.: PCT/EP2013/052443
§ 371 (c)(1),
(2) Date: Aug. 6, 2014

(87) PCT Pub. No.: WO2013/117651
PCT Pub. Date: Aug. 15, 2013

(65) Prior Publication Data
US 2015/0002989 A1  Jan. 1, 2015

(30) Foreign Application Priority Data

Feb. 7, 2012 (FR) ..................... 12 51138

(51) Int. Cl.
*H01G 9/00* (2006.01)
*H01G 9/10* (2006.01)
(Continued)

(52) U.S. Cl.
CPC ................. *H01G 9/10* (2013.01); *H01G 2/10* (2013.01); *H01G 2/103* (2013.01); *H01G 2/106* (2013.01);
(Continued)

(58) Field of Classification Search
CPC ............ H01G 9/08; H01G 9/10; H01G 11/78; H01G 11/84; H01G 11/80
See application file for complete search history.

(56) References Cited

U.S. PATENT DOCUMENTS

| | | | |
|---|---|---|---|
| 4,494,174 A * | 1/1985 | Schroeder | ............... H01G 9/10 361/500 |
| 5,348,815 A | 9/1994 | Barker | |
| 5,798,906 A | 8/1998 | Ando et al. | |
| 7,817,404 B2 | 10/2010 | Miura et al. | |
| 2013/0027846 A1 * | 1/2013 | Ashino | ................. H01G 9/048 361/519 |

FOREIGN PATENT DOCUMENTS

| CN | 101436668 A | 5/2009 |
|---|---|---|
| EP | 0 836 237 A1 | 4/1998 |

(Continued)

OTHER PUBLICATIONS

Non-Final Office Action in U.S. Appl. No, 14/377,169 dated Mar. 10, 2016. 11 pages.

*Primary Examiner* — Dion R Ferguson
(74) *Attorney, Agent, or Firm* — Blakely Sokoloff Taylor & Zafman LLP

(57) ABSTRACT

The invention relates to a method for manufacturing a unit for storing electrical energy, comprising a cover and an outer casing, the method including a closing step (400) consisting of contactlessly applying a compressive force to one of the parts forming the storage unit, such that the cover and the outer casing are mechanically titled into one another so as to close the outer casing using the cover by means of the engagement of the shapes thereof.

14 Claims, 7 Drawing Sheets

(51) Int. Cl.
   *H01G 9/08*      (2006.01)
   *H01G 11/78*     (2013.01)
   *H01G 11/80*     (2013.01)
   *H01G 11/84*     (2013.01)
   *H01G 2/10*      (2006.01)
   *H01M 2/04*      (2006.01)
   *H01G 9/145*     (2006.01)
   *H01G 13/00*     (2013.01)

(52) U.S. Cl.
   CPC .............. *H01G 9/0029* (2013.01); *H01G 9/08* (2013.01); *H01G 9/145* (2013.01); *H01G 11/78* (2013.01); *H01G 11/80* (2013.01); *H01G 11/84* (2013.01); *H01G 13/003* (2013.01); *H01M 2/04* (2013.01); *H01M 2/0434* (2013.01); *Y02E 60/13* (2013.01); *Y10T 29/417* (2015.01)

(56) References Cited

FOREIGN PATENT DOCUMENTS

| | | |
|---|---|---|
| EP | 1 737 005 A2 | 12/2006 |
| EP | 2 104 122 A1 | 9/2009 |
| EP | 2 385 566 A1 | 11/2011 |
| JP | 59175553 A | 10/1984 |
| WO | WO 2007/132462 A1 | 11/2007 |

\* cited by examiner

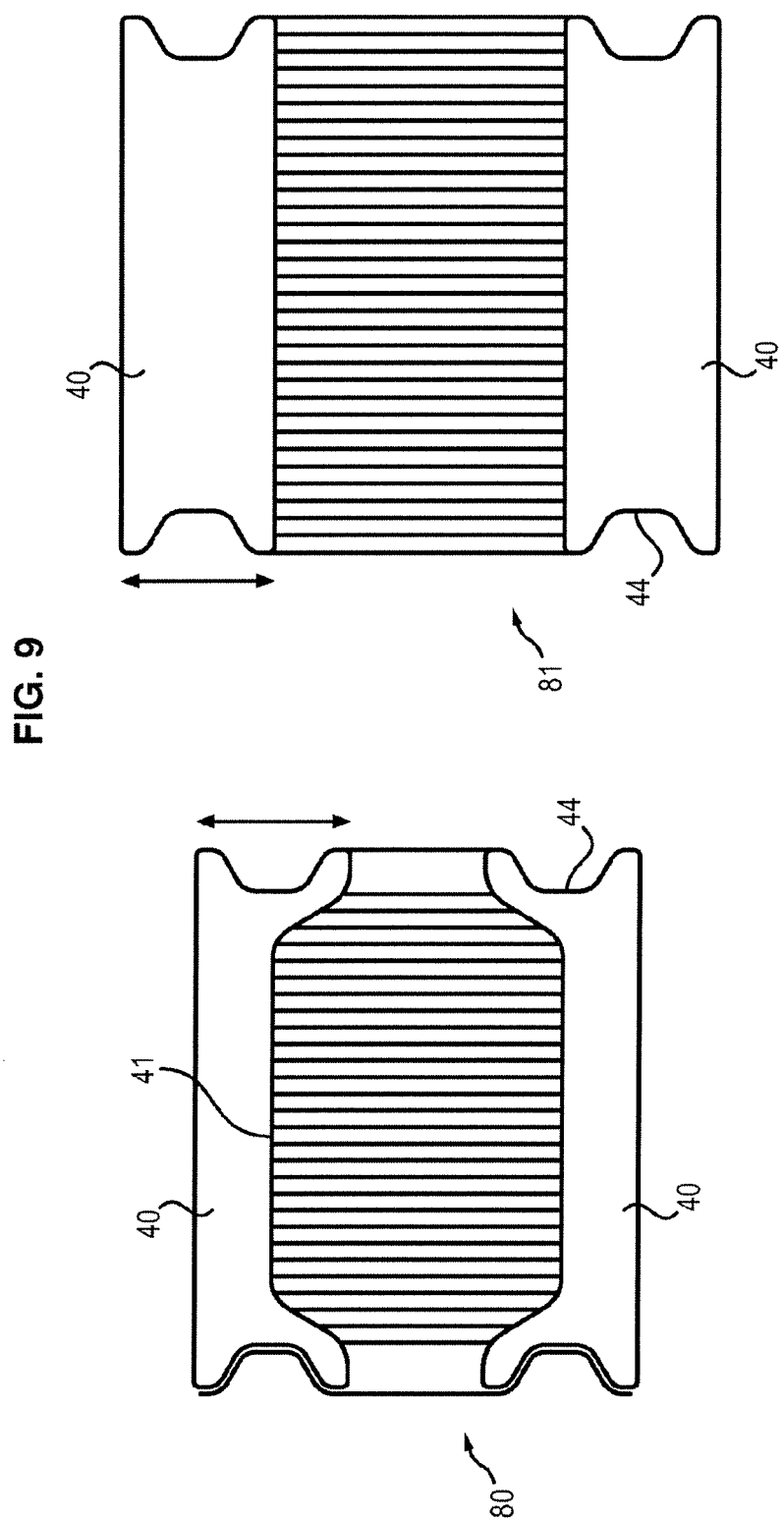

METHOD FOR MANUFACTURING A UNIT FOR STORING ELECTRICAL ENERGY

TECHNICAL FIELD

The present invention relates to the technical field of electrical energy-storage units.

More particularly, the present invention relates to a device and a method for the manufacture of such storage units, and a resulting storage unit.

Within the scope of the present invention, <<electrical energy-storage unit>> means a capacitor (i.e. a passive system comprising two electrodes and an insulator), or a ultra-capacitor (i.e. a passive system comprising at least two electrodes, an electrolyte and at least one separator), or a battery (i.e. a system comprising an anode, a cathode and an electrolyte solution between the anode and the cathode), for example of lithium battery type.

PRIOR ART

FIG. 1 illustrates an example of an energy-storage unit of the tubular ultra-capacitor type.

This energy-storage unit 10 comprises the following elements:
- a tubular envelope 20 open at its two ends,
- a coiled element 30 such as a capacitive winding impregnated with a liquid electrolyte, and
- two covers 40 designed to crown the open ends of the tubular envelope 20.

Different manufacturing methods of such a storage unit are known. These different methods each comprise a step consisting of closing the tubular envelope with a cover. This closing step can be based on three techniques:
- mechanical crimping
- tight welding, or
- adhesion.

Mechanical Crimping

Document EP 2 104 122 describes a mechanical crimping or heading step consisting of deforming the tubular envelope 20 to fold it against the cover 40. A sealing piece of elastomer type, such as a joint 45, is compressed to ensure sealing against liquid and gas.

A disadvantage of the crimping technique relates to the need to use a sealing piece of elastomer type. In fact, the risks of leak are linked to compression of this sealing piece which is difficult to control, the stresses generated during crimping on this sealing piece then able to be distributed unevenly.

Another disadvantage relates to the duration of the crimping operation. In fact, the tool used to perform crimping must circumvent the tubular envelope, which increases the duration of the closing step. As a variant, it is possible to make use of a tool for simultaneously applying contact pressure over the entire circumference of the storage unit to crimp the tubular envelope and the cover. However, in this case it is necessary to have a different tool for each diameter of tubular envelope and cover, and this requires costly investment.

Another disadvantage encore relates to the limited life duration of storage units made by performing a mechanical crimping step. During ageing of the storage unit the internal pressure of the storage unit rises. This rise in pressure can cause opening of the crimping, which considerably reduces the service life of the storage unit.

Finally, the crimping operation can engender stress on the coiled element 30, degrading initial performances of the resulting storage unit.

Tight Welding

Welding can be done via Tungsten Inert Gas (TIG), via laser, or by other conventional welding techniques. In the case of welding, the sealing piece of elastomer type between the tubular envelope and the cover is no longer necessary, and this prolongs the service life of the storage unit.

However, tight welding has many disadvantages.

The welding step in fact causes heating of the tubular envelope, which can burn the thermoplastic insulation, the separators or the binder films constituting the coiled element 30. Also, it is not possible to perform impregnation of the coiled element 30 prior to welding as the electrolyte is inflammable.

Using the welding step also means performing preparation steps of the surfaces to be welded—such as cleaning, scouring and drying of the tubular envelope and/or of the cover—to ensure an adequate level of sealing. This operation is costly as it is difficult to execute.

Also, in the case of welding by laser beam or TIG, it is necessary to bypass the tubular envelope to weld it over its entire circumference, and this prolongs the closing step.

Finally, conducting a welding step involves high manufacturing costs (consumable gas, added metal, . . . ).

Adhesion

During an adhesion step, assembly of the cover on the tubular envelope is realized by using an adhesive, generally epoxy, sometimes charged with metal.

Assembly techniques based on an adhesion step are cumbersome for the following reasons. First, the adhesion step means conducting previous preparation steps of surfaces to be adhered—such as degreasing and drying—to ensure levels of sealing and adequate mechanical resistance. A preparatory abrasion step can also be carried out to roughen the surfaces to be adhered to improve adherence and adhesiveness. These preparatory steps are costly as they are difficult to carry out. And, adhesive which has a connecting function also has an electrical insulating function. The volume of adhesive deposited is consequently relatively large, and resistance to shear is less reliable (a fine bead of adhesive is more resistant than a thick bead). To compensate this defect it is common to use specific and very expensive adhesives. Also, adhesive solvent vapour must be treated so as not to irritate production operators, and this creates extra costs. Finally, the long polymerisation time (of the order of 30 min) limits production yield of such methods.

Assembly techniques based on an adhesion step can also degrade the quality of the resulting storage unit for the following reason. Polymerisation of the adhesive is done in general hot (epoxy adhesive). Thermal shocks and relative dilations between adhesive and aluminium can cause electrical disconnection of the cover and the coiled element.

An aim of the present invention is to propose a manufacturing method of an electrical energy-storage unit, which eliminates at least one of the above disadvantages, especially a method which is simpler and less costly than existing methods.

SUMMARY OF THE INVENTION

For this purpose a manufacturing method of an electrical energy-storage unit such as a capacitor or an ultracapacitor is proposed, the storage unit comprising:
- an external envelope comprising a coupling zone, the external envelope being open at at least one of its ends, at least one cover comprising a coupling zone, the cover being intended to be positioned at the level of the open end of the external envelope such that the coupling zones are opposite each other, at least one of the coupling zones including at least one relief portion such as a projection or a cavity, the method comprising a closing step consisting of applying a contactless compression force to at least one of the pieces constituting the storage unit such that the cover and the external envelope come into contact with each other, especially fit mechanically into each other, at the level of the portion or portions in relief to close the open end of the external envelope with the cover by cooperation of form.

It is noted that <<relief portion>> is a portion at least partially in projection and/or in depression relative to a reference portion of the element. This relief portion, located on the lateral wall of the element, causes modification (increase and/or decrease) of the dimensions of the element at its axial section.

Preferably, the closing step consists of applying a contactless magneto-mechanical force to at least one of the pieces constituting the storage unit—for example by using an inductor—such that the cover and the external envelope come into contact with each other at the level of the portion or portions in relief to close the open end of the envelope with the cover by cooperation of form.

As a function of the parameters used during manufacture, this method:
crimps the cover and the external envelope, or
welds the external envelope and the cover, wherein case there is continuity of materials of the two pieces and diffusion of atoms from one piece to the other.

Therefore, the method especially enables assembly of pieces made from electrically conductive materials having different melting points, which is not possible with traditional welding devices.

The advantages of the method according to the invention are the following:
the duration of the closing step is very short, typically less than one second, which allows the method to be adapted to mass production;
heating of the pieces constituting the storage unit is very low, which on the one hand does not damage the coiled element or the coiled elements located inside the external envelope and on the other hand leaves the option for taking some steps such as impregnation prior to the closing step, which avoids extra closing steps of the unit.
during execution of the closing step, the relaxation produced at the interface between the cover and the external envelope is such that it causes a gas jet—comparable to plasma—which sands off the surfaces to be assembled: it is therefore unnecessary to prepare the surfaces of the external envelope and cover prior to the closing step;
the costs associated with executing the method are low, because on the one hand the tool used to perform the closing step can be utilised with external envelopes and covers of different diameters, and on the other hand maintenance operations of this tool are limited as the tool includes no moving part, limiting its wear.

Preferred, though non-limiting, aspects of the method according to the invention are the following:
the magneto-mechanical force is applied by means of a generation device of a magnetic pulse, the method comprising a positioning step of the envelope and of the cover such that they are enclosed at least partially by the generation device, especially an inductor of the device. Preferably, the cover and the envelope are positioned such that the contactless compression force is applied only to the cover and the envelope at the level of the coupling zones; this limits the risks of degradation of a coiled element contained in the envelope by compression of the walls of the envelope onto the latter. The inductor comprises especially a coil arranged so as to partially enclose the storage unit at the level of the coupling zones of the cover and of the envelope;

the pulse is preferably generated at an energy of between 5 and 20 kJ. The inductor especially is fed with electrical voltage of between 5 and 6 kV and an electrical current of:
between 150 A and 250 A to perform crimping,
between 450 A and 600 A to perform welding the method comprises, prior to the closing step, a positioning step of the cover and of the envelope. Especially a first element, especially the envelope, is positioned around the other element, especially the cover, such that the coupling zone of the first element encloses the coupling zone of the other element, the relief portion being arranged in the coupling zone of the other element;

the portion or the portions in relief are configured such that the element presents at least two shoulders oriented in opposite directions. The element is also positioned in the inductor such that the compression force is in a direction essentially perpendicular to the normal of the shoulders. The two shoulders have an essentially axial normal (or essentially perpendicular to the opening plane of the envelope) whereas the compression force is directed essentially radially. In this way, axial movement of the cover relative to the external envelope according to both directions can be prevented, not only to prevent the unit from opening when subjected to internal pressure during the life of the unit but also to prevent, during the manufacturing method, the capacitive element from being damaged under the effect of the compression force applied to the cover and/or to the envelope;

In a preferred embodiment, a plurality of portions in relief is arranged in the cover, the cover comprising at least one lateral wall and two end walls, the portions in relief comprising at least one first cavity opening on the lateral wall and an end wall and at least one second cavity, opening on the lateral wall and the other end wall. The first cavity or the first cavities can then open on a first part or first parts of the lateral wall while the second cavity or second cavities open on a second part or second parts of the lateral wall, the first and second parts of the lateral wall being separate. In other words, the cavities are staggered. The cavities can make up over half the height of the cover. The cover can be for example of a general cylindrical form, the end walls forming the bases of the cylinder. It can also be a parallelepipedic shape. This embodiment is particularly advantageous as it does not excessively increase the bulk of the cover (axially or radially) due to the presence of portions in relief on the latter. Also, as the cavities open each on the end wall, such a cover can be easier to make, especially by moulding. It is also clear that a cover according to this embodiment does not make assembly of the cover and of the capacitive element, generally via LASER welding, more complex than in the state of the art since some portions of the end face, devoid of cavity, have the same configuration as according to the state of the art and extend to the end of the coiled element. Finally, such a configuration better adapts to the needs relative to operation of the unit. In fact, the size and the number of cavities located on the end walls as a function of forces likely to be exerted on the unit can be made asymmetrical. Therefore, the external end face can be provided with more cavities than on the internal end face since the forces due to overpressure of the unit during its life are potentially considerable;

at least one relief portion can also or alternatively comprise:
  a peripheral bead, for example annular, and/or
  a plurality of teeth, and/or
  a groove, such as a groove having the following dimensions:
    a depth greater than a millimeter and preferably greater than three millimeters, which improves the mechanical resistance of the cover on the external envelope,
    a width of less than three millimeters, preferably less than two millimeters, which decreases the thickness of the cover and therefore the bulk of the storage unit;
    it is clearly possible to make contact between the pieces even if the groove has such dimensions due to the particular configuration of the material (hyper-plasticity) generated by a magnetic pulse. Such dimensions also decrease the bulk of the cover and of the unit in general, in another embodiment, the first element is constituted by the envelope and the other element by the cover, the cover comprising a peripheral flange at its end to be located near a capacitive element housed inside the envelope, the coupling zone being located at least partially at the level of the flange. The capacitive element can be cut out, prior to the closing step, such that this element has a form complementary to the end of the cover fitted with the flange. The cover can comprise an oblique surface and the capacitive element can be chamfered. This configuration decreases the bulk of the unit;

the method comprises, prior to the closing step, a step consisting of placing a joint—made for example of plastic material (for example polymer or elastomer or a mix of polymer and elastomer) or ceramic—between the coupling zones of the cover and of the external envelope: this joint ensures at least one of the two following functions:
  sealing at the interface between the cover and the external envelope,
  electrical insulation of the cover and of the external envelope, especially when the external envelope and the cover both comprise electrically conductive material.

The step for placing can especially be a positioning step of a piece separate from the cover and the external envelope or a step for depositing material such as those cited hereinabove on one of the pieces of the cover and the envelope to form a joint integrated with said piece.

The presence of the joint is more particularly necessary when the cover and the external envelope are electrically conductive.

The method comprises, prior to the closing step, a step consisting of positioning an electrically conductive ring around the coupling zones, the closing step consisting of applying a contactless magneto-mechanical force to the ring—for example using an inductor—such that the cover and the external envelope come into contact with each other at the level of the relief portion to close the open end of the envelope with the cover by cooperation of form. This embodiment is particularly advantageous when the piece to be deformed by means of the magnetic pulse is a piece not electrically conductive which therefore cannot be directly deformed by a magnetic force;

the method comprises, prior to the closing step, a step consisting of depositing a layer of electrically conductive material—such as electrically conductive paint—on the external peripheral face of at least one of the elements of the envelope and the cover, especially the element enclosing the other, said layer being deposited at least on a zone opposite the coupling zone of this element. Preferably this element is the envelope, the latter being made of electrically insulating material which electrically insulates the two terminals of the unit without the aid of a joint. Alternatively, this step can be omitted by avoiding the presence of a joint by using a multilayer material comprising at least one electrically insulating internal layer and another electrically conductive layer;

the storage unit comprises an internal core extending longitudinally inside the capacitive element and passing through the unit from side to side, the method comprising also, during the closing step, an application step of a contactless compression force on at least one piece of the unit such that the cover and/or the envelope is deformed to come into contact with the internal core to close the energy-storage unit at the level of the core;

the method comprises, prior to the closing step, an impregnation step of a capacitive element intended to be housed in the external envelope;

The invention also relates to an electrical energy-storage unit comprising:
  an external envelope comprising a coupling zone, the external envelope being open at at least one of its ends,
  at least one cover comprising a coupling zone, the cover being intended to be positioned at the level of the open end of the external envelope such that the coupling zones are opposite each other, at least one of the coupling faces comprising a relief portion,
  each of the two coupling zones comprises at least one relief portion, each relief portion being in contact with a relief portion of the other element such that the external envelope and the cover are immobilised relative to each other at least according to a direction, especially axially, by cooperation of form.

In particular, said electrical energy-storage unit is likely to be obtained by the method described hereinabove. It could also be obtained by another method for bonding the cover and the external envelope (which could for example be connected by mechanical crimping). The storage unit can also or alternatively comprise one or more of the characteristics being relative thereto and described hereinabove.

Preferred, though non-limiting, aspects of the storage unit according to the invention are the following:
  the electrical energy-storage unit comprises undulations at the interface between the cover and the external envelope;
  the interface between the cover and the external envelope is devoid of traces of a tool used for crimping.

Another aim of the invention is a cover for an energy-storage unit, said cover comprising at least one lateral wall and two end walls, the cover comprising also a plurality of portions in relief, these portions in relief comprising at least one first cavity opening on the or at least one of the lateral walls and an end wall and at least one second cavity, opening on the or at least one of the lateral walls and the other end wall.

Such a cover can also comprise one or more of the characteristics described hereinabove and concerning the latter: for example, the cavities are staggered, and/or extend over half the height of the lateral wall of the cover, and the cover is made of metal, etc.

BRIEF DESCRIPTION OF THE FIGURES

Other characteristics, aims and advantages of the present invention will emerge from the following description, which is purely illustrative and non-limiting and must be considered in conjunction with the attached drawings, wherein:

FIGS. 6, 7 and 9 illustrate examples of energy-storage units obtained from variants of the method according to the invention, FIG. 8 partially illustrates the device of FIG. 5 for the manufacture of different types of storage units;

DETAILED DESCRIPTION OF THE INVENTION

The method and the device for manufacture according to the invention will now be described in more detail in reference to the figures. In these different figures, the equivalent elements of the method and of the device bear the same numerical references.

Figure 3:
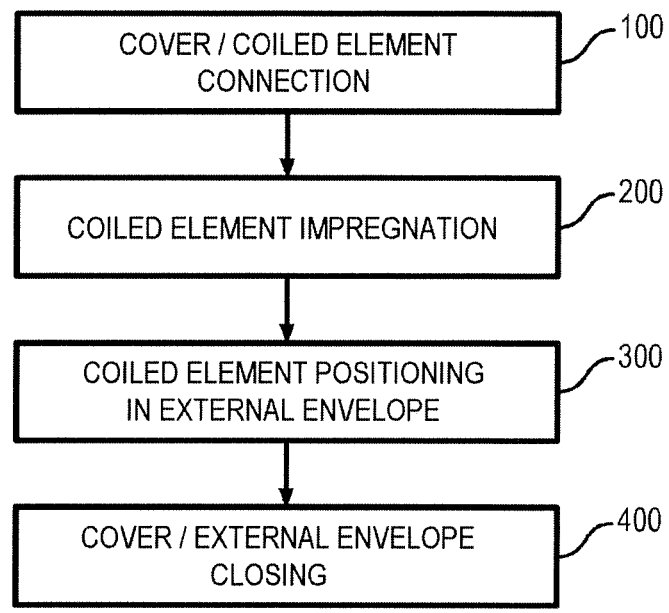

In reference to FIG. 3, this illustrates an embodiment of the method according to the invention. This method makes an electrical energy-storage unit comprising a coiled element 30, an external envelope 20 open at one of its ends and a cover 40.

The first step (referenced 100) consists of connecting the cover 40 and the coiled element 30. The cover 40 is placed on the coiled element 30 and welding—such as laser welding by transparency—is performed at the interface between the cover 40 and the coiled element 30.

The second step (referenced 200) consists of impregnating the coiled element connected to the cover in an electrolyte.

The third step (referenced 300) consists of placing the coiled element connected to the cover in the external envelope.

The fourth step (referenced 400) consists of closing the open end of the external envelope with the cover. The method can comprise different variants of the closing step, for example as a function of the materials constituting the cover and the external envelope.

These different variants will be described hereinbelow and in all cases comprise application of a contactless compression force to one of the pieces constituting the storage unit such that the cover and the external envelope fit mechanically in each other. The application of a compression force can for example be obtained by generating a magnetic pulse.

Those skilled in the art will appreciate that the impregnation step can be performed prior to the closing step. In fact, the closing step is performed (almost) cold, such that the risks of enflaming the electrolyte are limited. It could however also be performed after the closing step.

Figure 4:
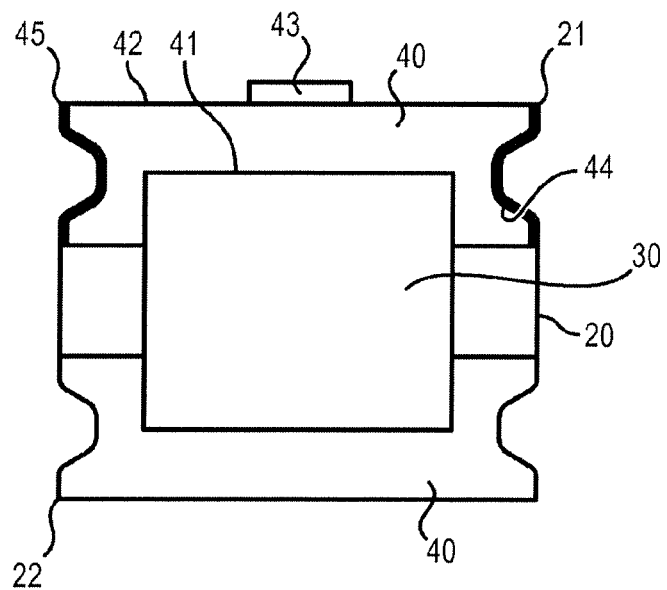
FIG. 4 illustrates an example of a storage unit obtained from an embodiment of the method according to the invention, FIG. 5 schematically illustrates an example of a device for manufacture for executing the method according to the invention.

In reference to FIG. 4, this illustrates an energy-storage unit made by executing an embodiment of the method according to the invention.

The storage unit comprises an external envelope 20, a coiled element 30 and two covers 40.

The external envelope 20 is a tube open at its two ends.

Each cover 40 has the form of a full disc. It can comprise a hollowed face forming a cradle 41 designed to receive the coiled element 30. In other terms, the end face of the cover turned towards the interior of the unit comprises a peripheral flange, this flange delimiting the cradle to receive the coiled element. The flange can comprise an oblique wall. The coiled element can be chamfered so that it is inserted into the cradle. As illustrated in FIG. 9, the presence of a hollowed face 41 in the cover 40 limits the both the axial and radial bulk of the storage unit 80 relative to a storage unit 81 wherein the covers 40 comprise no hollowed portion.

The face 42 opposite the hollowed face 41 comprises a pin 43 for electrical connection in series or in parallel of two adjacent storage units. The peripheral face of the cover 40 comprises a groove 44. The presence of a groove reinforces the link between the external envelope and the cover during the ageing and the rise in pressure of the unit. The groove is configured essentially in a U and the two arms of the U form opposite shoulders for axial immobilisation of the cover and of the envelope for this purpose. Advantageously, the groove can have the following dimensions:

- a depth greater than a millimeter and preferably greater than three millimeters, which improves the mechanical resistance of the cover on the external envelope after the closing step,
- a width less than three millimeters, preferably fewer than two millimeters, which decreases the thickness of the cover and therefore the bulk of the storage unit.

The covers 40 and the external envelope 20 are made of electrically conductive material, such as metal.

In the example illustrated in FIG. 4, the two ends of the external envelope are not closed identically. In fact, the storage unit comprises an annular joint 45 between the cover 40 and the upper end of the external envelope 20, whereas it does not comprise a joint between the cover 40 and the lower end 22 of the external envelope 20.

The method carried out to produce the storage unit illustrated in FIG. 4 is the following:
- connecting (positioning and welding) the covers 40 on the coiled element 30,
- impregnating the coiled element 30 connected to the covers 40 in an electrolyte,
- arranging the coiled element 30 connected to the covers 40 in the external envelope 20, then
- for the upper end 21 of the external envelope 20:

positioning the annular joint 45 in the groove 44 of the cover 40 (or between the external envelope and the cover), generating a pulsed magnetic force at the level of the upper end 21 of the external envelope 20 to deform the latter such that it matches the form of the peripheral face of the cover 40 and fits mechanically in the latter, for the lower end 22 of the external envelope 20:

generate a pulsed magnetic force at the level of the lower end 22 to deform the latter so that it matches the form of the peripheral face of the cover 40 and is welded to the latter.

The cover/envelope bond made at the level of the upper end 21 is crimping by magnetic pulse, while the cover/envelope bond made at the level of the lower end 22 is welding by magnetic pulse. Those skilled in the art will appreciate that the cover/envelope bond made at the level of the lower end 22 could be crimping by magnetic pulse, even without the presence of a joint. In fact, making a bond of welding or crimping type depends on energy used to create the liaison. It is noted that only the envelope is deformed since, because the force is applied all over the unit and the cover is a solid piece, it does not undergo substantial deformation, as opposed to the envelope which has a central gap and can therefore contract at the level of this gap.

Figure 5:
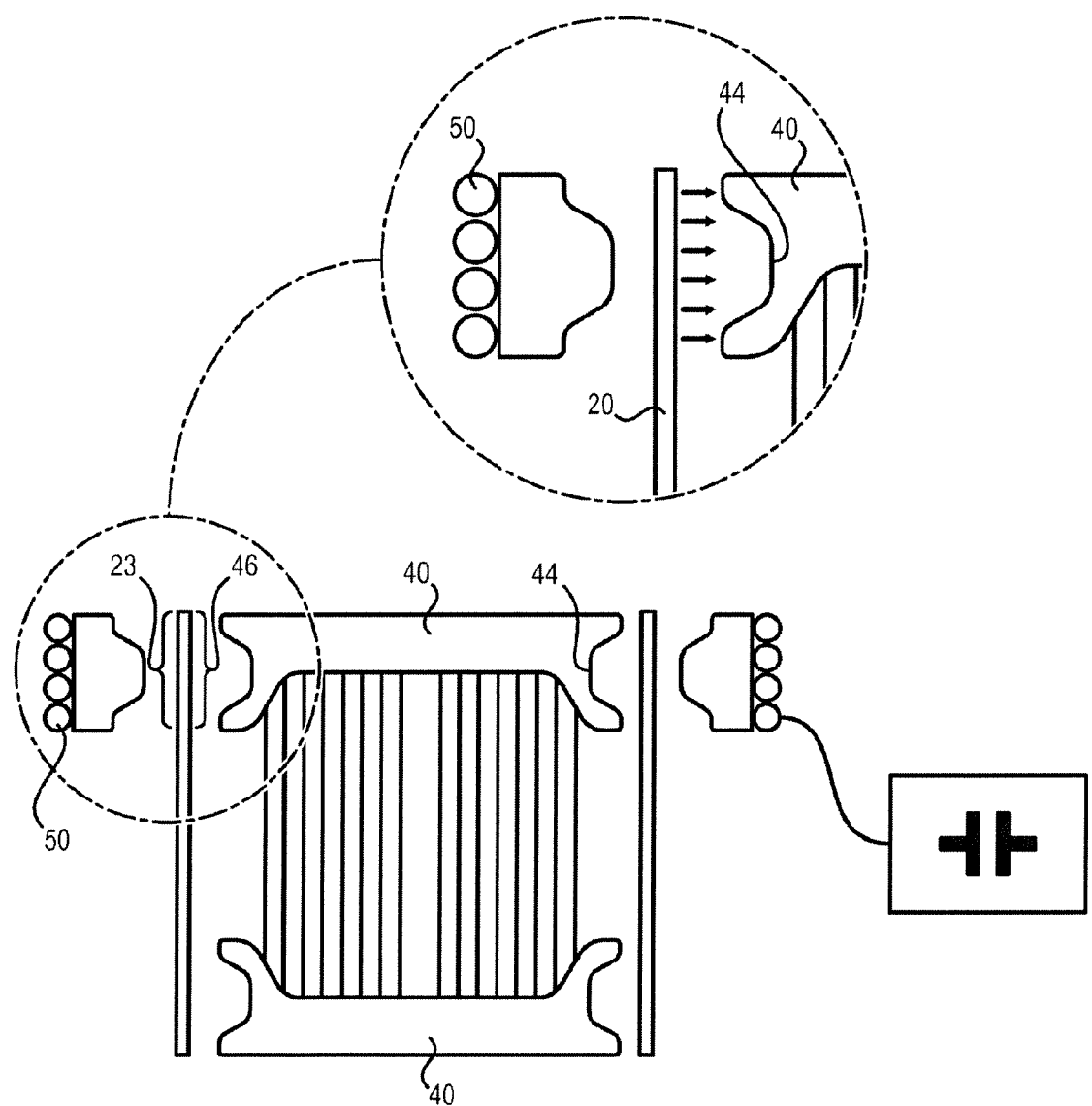

In reference to FIG. 5, this illustrates an embodiment of a device for executing the method described previously. The device comprises a compressor for applying a contactless compression force to one of the pieces constituting the energy-storage unit. This creates mechanical fitting of the cover and the external envelope to close the storage unit by cooperation of form between the external envelope and the cover.

In the embodiment illustrated in FIG. 5, the compressor consists of an inductor—such as a coil—capable of applying a contactless magneto-mechanical force. The inductor is a coil for example.

The device comprises a generator (not shown) connected to the coil 50. The storage unit to be closed is intended to be placed at the centre of the coil 50 such that the windings of the coil enclose it partially.

The operating principle of the device will now be described in reference to a storage unit comprising:

an external envelope 20 comprising a coupling face 23, the external envelope 20 being open at one of its ends, a cover 40 comprising a coupling face 46 including a cavity 44, the cover 40 being intended to be positioned at the level of the open end of the external envelope.

The coupling faces 23, 46 are placed opposite each other to effect closing of the storage unit.

The cover 40 and the external envelope 20 are provisionally fixed relative to each other. This fixing can be executed by way of various means of provisional fixing, such as for example the joint described in reference to FIG. 4 and which allows adequate adhesion of the cover 40 on the external envelope 20.

The cover 40 and the external envelope 20 are positioned au centre of the coil 50. Advantageously only the coupling faces 23, 46 opposite can be placed at the centre of the coil. In other terms, it can be arranged to have in the coil only that region of the envelope where the peripheral surfaces of the external envelope and the cover are superposed. This in fact prevents the external envelope 20 from being compressed against the coiled element 30, possibly damaging the latter.

Once the storage unit is positioned, the generator (charged) discharges substantial energy over a very short time in the coil 50. The coil is oriented so that the force has an essentially radial direction.

The coupling zone 23 of the external envelope 20 is projected at considerable speed in the direction of the coupling face 46 of the cover 40. The coupling face 23 of the external envelope 20 conforms to the shape of the cavity 44 arranged on the coupling face 46 of the cover 40.

The device described in reference in FIG. 5 projects the external piece onto the internal piece at a speed of 150 to 600 m/s.

General information on operation of the generation device of the pulse is the following:

maximum energy: 25 kJ,
frequency: 15 kHz,
Capacitance: 300 to 800 µF,
Voltage: 5-6 kV.

The generation device of the magneto-mechanical pulse can be used to crimp or weld as a function of the parameters of use of the latter:

power:
   crimping: 8 kJ,
   welding: 15 to 18 kJ,
Amperage:
   Crimping: 150 A-250 A,
   Welding: 450 to 600 A.

Figure 6:
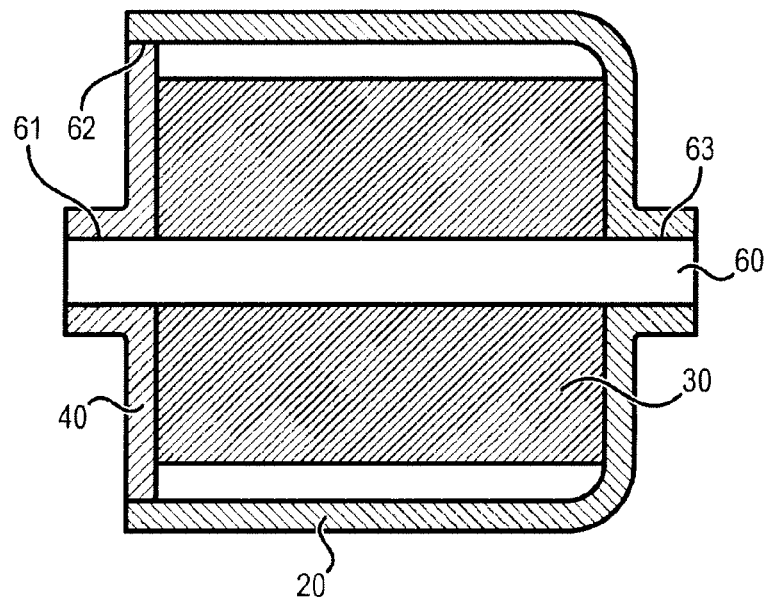

This device can be used to assemble different pieces of the electrical energy-storage unit as illustrated in FIG. 6. This energy-storage unit comprises:

an external tubular envelope 20 open at one of its ends, a cover 30 in the form of a disc intended to be placed at the level of the open end, and a core 60 if the form of a rod intended to be positioned coaxially to the axis of symmetry of the external tubular envelope 20.

The cover 40, the core 60 and the external envelope 20 can be made of a conductive material such as metal. In this case, the core 60 is insulated from the cover 40 and the external envelope 20 by means of an electrical insulator to avoid the risks of short-circuit. As a variant, the core can comprise electrically insulating material such as plastic. The external envelope 20 and the cover 40 can each comprise a flange for receiving the core, especially to allow welding of the coiled element 30 respectively on the cover 40 and the back of the external tubular envelope 20.

The device and the manufacturing method according to the invention can be used for:

assembly, especially a welding 61 core/cover.

assembly, especially a welding 62 cover/external envelope, and assembly, especially a welding 63 core/external envelope.

Figure 7:
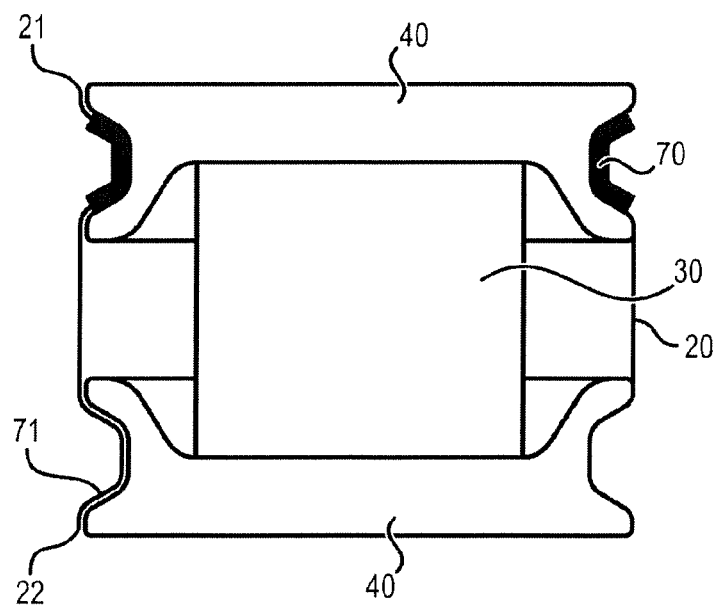

In reference to FIG. 7, this illustrates another type of storage unit obtained by using another variant embodiment of the method according to the invention. This storage unit comprises:

a coiled element 30, an external tubular envelope 20 made of electrically insulating material such as plastic, the envelope including two coupling faces at the level of its open upper 21 and lower ends 22, two covers 40 made of electrically conductive material, each cover comprising a coupling face having an annular groove 44, a crimping ring 70 (or a crimping wire) at the level of the upper end 21 of the external envelope 20, a layer 71 of electrically conductive material at the level of the lower end 22 of the external envelope.

The crimping ring 70 ensures transfer of magnetic energy generated during the closing step of kinetic displacement energy to induce an impact between the external envelope and the cover. The deformation of the ring conductive causes deformation of the insulating envelope on which the magnetic force does not act.

The method executed to obtain the storage unit illustrated in FIG. 7 is the following:
- connecting (positioning and welding) the covers 40 on the coiled element 30,
- impregnating the coiled element 30 connected to the covers 40 in an electrolyte,
- placing the coiled element 30 connected to the covers 40 in the external envelope 20, then
- for the upper end 21 of the external envelope 20:
  - positioning the crimping ring around the coupling face of the external envelope,
  - generating a pulsed magnetic force at the level of the upper end 21 of the external envelope 20 for projecting the crimping ring against the external envelope to fit it mechanically in the cover 40,
- for the lower end 22 of the external envelope 20:
  - depositing a layer of electrically conductive material at the level of the contact face of the external envelope,
  - generating an electromagnetic pulse at the level of the lower end 21 so as to apply a magneto-mechanical force to the external envelope 20 at the level of the layer of electrically conductive material to make close contact between the cover and the external envelope by deformation of the latter.

The method can also be executed on other types of storage units.

For example, the method can be used to make a non-cylindrical storage unit, such as a storage unit of hexagonal, triangular, octagonal, rectangular transversal cross-section, etc.

Figure 8A:
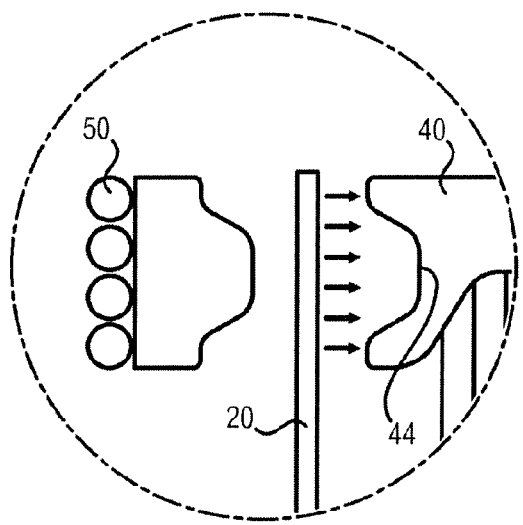
Figure 8B:
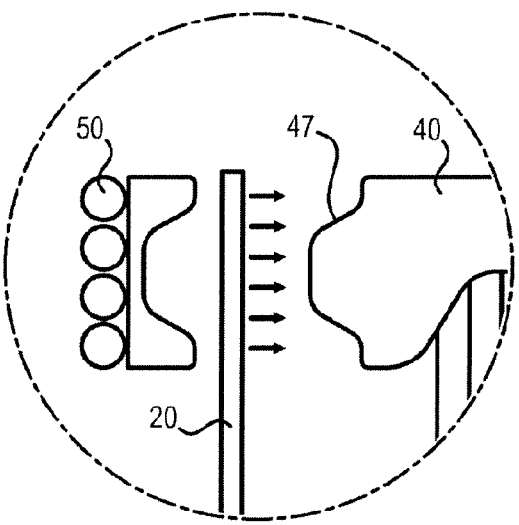
Figure 8C:
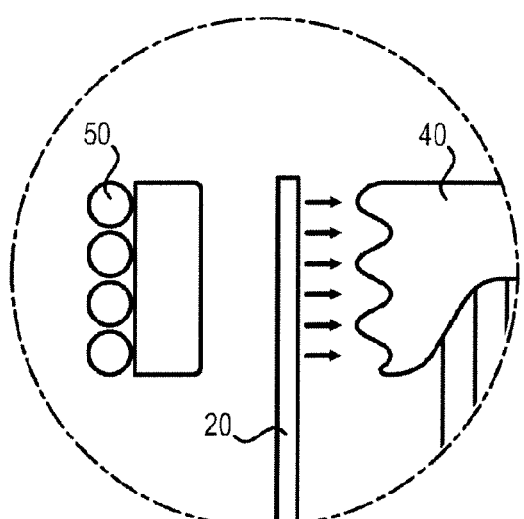

Also, the cover can have an annular bead 47 (as illustrated in FIG. 8b) rather than an annular groove 44 (as illustrated in FIG. 8a) on its peripheral face forming a coupling face. As a variant, the peripheral face of the cover can comprise an indented form (as illustrated in FIG. 8c).

Figure 1:
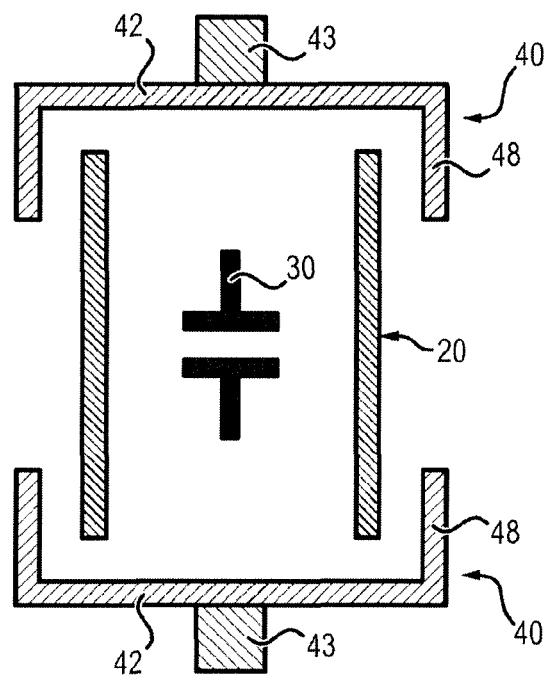
FIG. 1 is a block diagram of an example of an electrical energy-storage unit.
Figure 2:
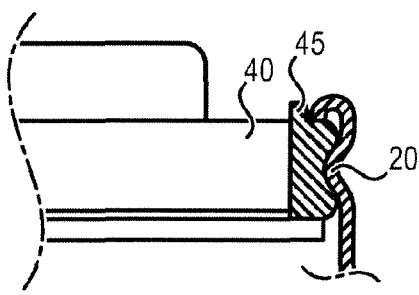
FIG. 2 is a partial schematic representation of an energy-storage unit obtained from a crimping method of the prior art, FIG. 3 schematically illustrates steps of the method according to the invention.

Also, the cover can comprise a turned-out edge 48 at its periphery as illustrated in FIG. 1. The peripheral turned-out edge 48 is provided to enclose the end of the external envelope when the cover 40 crowns the latter. In this case, it is generally the external envelope which can comprise a relief portion such as projection or a cavity.

Figure 10:
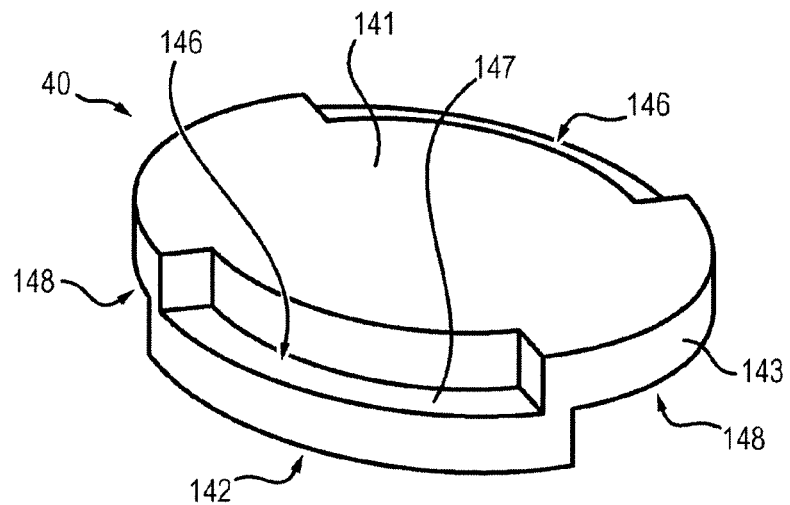
FIG. 10 is a representation in perspective of a cover of a unit according to another embodiment of the invention.
Figure 11:
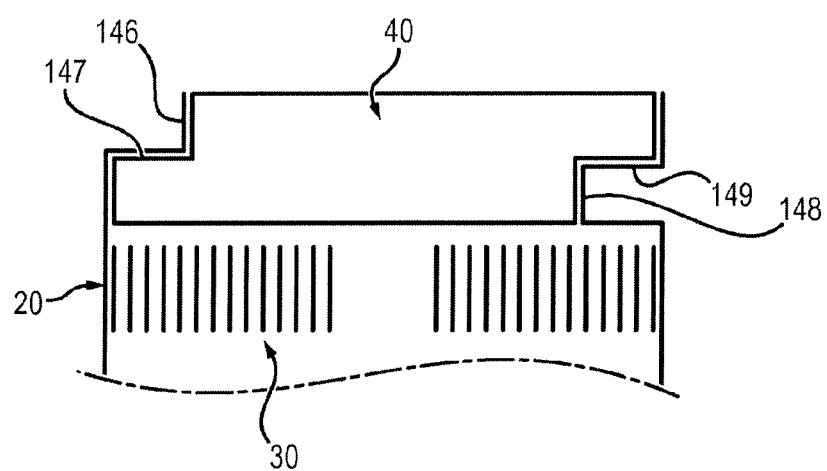
FIG. 11 is a representation in section on the one hand of a unit assembled with a method according to the invention from the cover of FIG. 9.

The cover 40 can also not have a constant cross-section. For example, the cover can be a cylinder comprising at its periphery one or more recessed portions forming a shoulder; these recessed portions can be offset angularly and extend alternatively on one or the other of the ridges of the cover. It can especially as shown in FIG. 10 have a general cylindrical form with two end walls 141, 142 and a lateral wall 143. This cover comprises a first series of cavities 146 opening at the same time on the lateral wall and on the end wall 141 and a second series of cavities 148 opening at the same time on the lateral wall 143 and on the end wall 142. As is evident from FIG. 10, these cavities do not extend over the entire circumference of the cover but are staggered or offset angularly, specifically the cavities of the first series extend in a first portion of the lateral wall, while the cavities of the second series extend in a second portion of the lateral wall separate from the first series without overlapping. In this way, the bottom wall 147 of the first series of cavities 46 forms a first axial shoulder, while the bottom wall 149 of the second series of cavities 48 forms a second opposite axial shoulder, these shoulders, as shown in FIG. 11, immobilising the external envelope and the cover relative to each other at least axially, when the unit has undergone the method according to the invention described in detail hereinbelow and when the envelope 20 has been deformed to match the shape of the cover. This embodiment is advantageous since it decreases the bulk of the cover and simplifies its manufacture Executing the method according to the invention allows the manufacture of storage units having particular technical characteristics not found in storage units obtained from former manufacturing methods based on welding, crimping or adhesion. In particular, the storage unit obtained from using the method and device according to the invention has no traces of contact with a tool used to perform mechanical crimping. In fact, crimping by magnetic pulse is done without tools (as opposed to rolling) and without change of state of metals (as opposed to welding and brazing).

Also, close analysis by metallography of a storage unit resulting from conducting the closing step with a magneto-mechanical force observes small wavelets inherent in the propagation of a shockwave at the interface of welding or crimping.

Also, there is no modification of the orientation of the grains at the level of the welding or crimping interface, as opposed to methods of the prior art using mechanical crimping.

The method and device for manufacture of storage unit described previously have many advantages.

They decrease the bulk of resulting storage units. In fact, it is no longer necessary to crown the external envelope with a cover comprising a turned-out edge to guarantee good mechanical resistance. Because of the method and device according to the invention, it is possible to use a cover of a diameter less than that of the external envelope such that the lateral wall of the latter encloses the peripheral face of the cover.

The method and the device according to the invention also better control the compression of the intermediate insulating pieces likely to be used. In fact, the compression force applied to the external envelope to cause its deformation is distributed homogeneously and identically at every point of the periphery. So when a joint is placed between the external envelope and the cover, its compression is better controlled and assured sealing is better.

They also improve sealing of the resulting storage units. In fact, generation of the magnetic pulse creates atomic adhesion of the external envelope and cover which is much better than conventional chemical adhesives (epoxy . . . ). Advantageously, this atomic adhesion can be applied to heterogeneous materials such as plastic/aluminium or ceramic/aluminium or elastomer/aluminium. The method is therefore more flexible Those skilled in the art will understand that many modifications can be made to the device and method described above without materially departing from new ideas presented here. It is therefore clear that the examples given above are only particular illustrations and in no way limiting. As a consequence, all modifications of this type are intended to be incorporated inside the scope of the attached claims.

The invention claimed is:

1. A method for manufacturing an electrical energy-storage unit comprising at least:
   - an external envelope comprising a coupling zone, the external envelope being open at at least one of its ends,
   - at least one cover comprising a coupling zone, the cover being intended to be positioned at the level of the open end of the external envelope such that the coupling zones are opposite each other,
   - at least one of the coupling zones including at least one relief portion, wherein the method comprises a closing step consisting of applying a contactless compression force to at least one of the pieces of the storage unit such that the cover and the external envelope come into contact with each other at the level of the portion or portions in relief to close the open end of the external envelope with the cover by cooperation of form.

2. The method according to claim 1, wherein the closing step consists of applying a contactless magneto-mechanical force to at least one of the pieces constituting the storage unit such that the cover and the external envelope come into contact with each other at the level of the relief portion to close the open end of the envelope with the cover by cooperation of form, said piece being made at least partially of electrically conductive material.

3. The method according to claim 2, wherein the magneto-mechanical force is applied by means of a device for generation of a magnetic pulse, the method comprising a positioning step of the envelope and of the cover such that they are enclosed at least partially by the generation device, especially an inductor of the device, the pulse being preferably generated at an energy of between 5 and 20 kJ.

4. The method according to claim 1, which comprises, prior to the closing step, a positioning step of the cover and of the envelope, the cover and the envelope being positioned in the generation device, such that the contactless compression force is applied only to the cover and the envelope at the level of the coupling zones (23, 46).

5. The method according to claim 1, wherein, prior to the closing step, a first element, especially the external envelope, is positioned around the other element, especially the cover, such that the coupling zone of the first element encloses the coupling zone of the other element, the relief portion being arranged in the coupling zone of the other element.

6. The method according to claim 1, wherein the portion or portions in relief are configured such that the element has at least two shoulders oriented in opposite directions and is positioned in the inductor such that the compression force is in a direction essentially perpendicular to the normal of the shoulders.

7. The method according to claim 6, wherein a plurality of portions in relief is arranged in the cover, the cover comprising at least one lateral wall and two end walls, the portions in relief comprising at least one first cavity opening on the or at least one of the lateral walls and an end wall and at least one second cavity, opening on the or at least one of the lateral walls and the other end wall.

8. The method according to claim 7, wherein the or the first cavities open on a first part or first parts of the or at least one of the lateral walls and the second cavity or second cavities open on a second part or second parts of the or at least one of the lateral walls, the first and second parts of the or at least one of the lateral walls being separate.

9. The method according to claim 1, wherein at least one relief portion comprises:
   a bead peripheral, and/or
   a plurality of teeth, and/or
   a groove, having preferably a depth greater than 1 mm, especially 3 mm.

10. The method according to claim 1, which comprises, prior to the closing step, a step consisting of positioning a joint between the coupling zones of the cover and the external envelope.

11. The method according to claim 1, which comprises, prior to the closing step, a step consisting of positioning an electrically conductive ring around the coupling zones, the closing step consisting of applying a contactless magneto-mechanical force to the ring such that the cover and the external envelope fit mechanically into each other at the level of the relief portion to close the open end of the envelope with the cover by cooperation of form.

12. The method according to claim 1, which comprises, prior to the closing step, a step consisting of depositing a layer of electrically conductive material to the external peripheral face of at least one of the elements of the external envelope and the cover, said layer being deposited at least on a coupling zone of this piece.

13. The method according to claim 1, which comprises, prior to the closing step, an impregnation step of a capacitive element intended to be housed in the external envelope.

14. The method according to claim 1, wherein the storage unit comprises an internal core extending longitudinally inside the capacitive element and passing through the unit from side to side, the method also comprising, during the closing step, an application step of a contactless compression force to at least one piece of the unit such that the cover and/or the envelope is deformed to come into contact with the internal core to close the energy-storage unit at the level of the core.

* * * * *